(No Model.) 3 Sheets—Sheet 3.
G. A. ANDERSON.
TRACTION ENGINE.
No. 538,574. Patented Apr. 30, 1895.
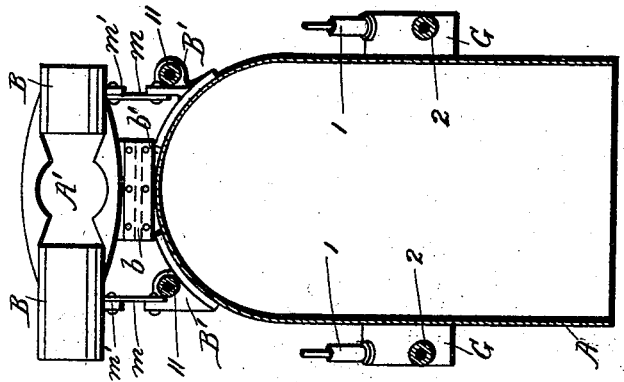
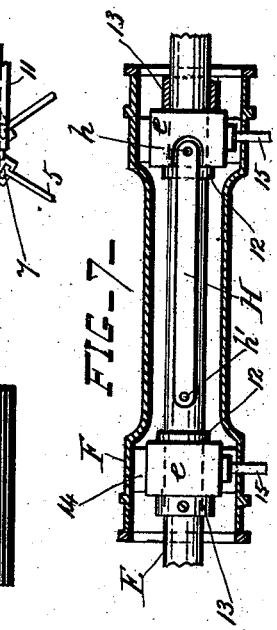
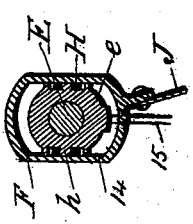
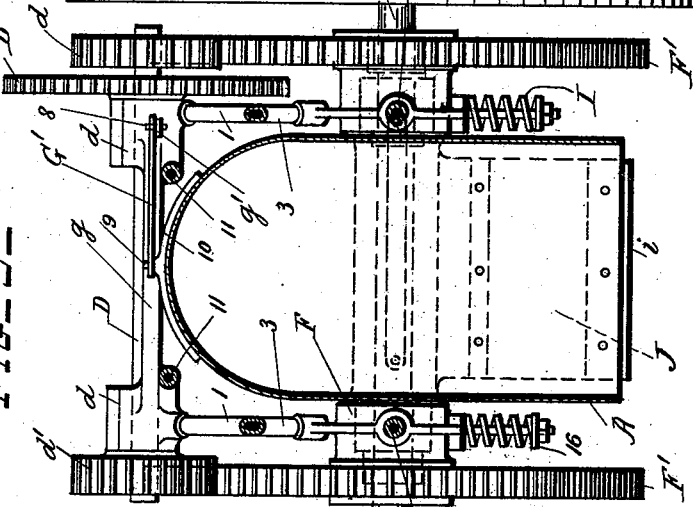
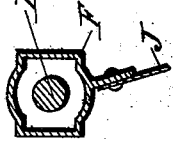
WITNESSES
INVENTOR
Gustaf A. Anderson
by Herbert W. T. Jenner.
Attorney

UNITED STATES PATENT OFFICE.

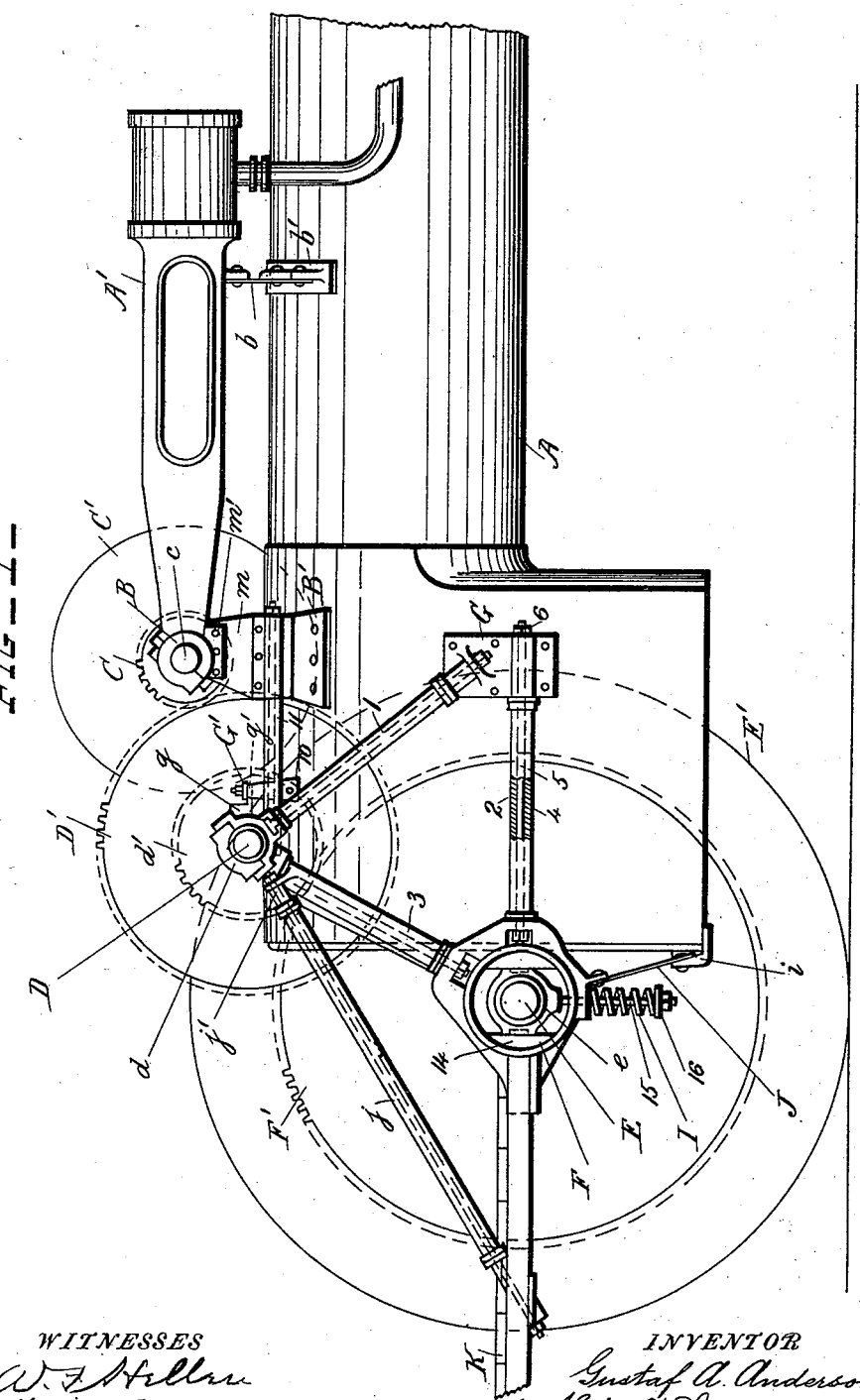

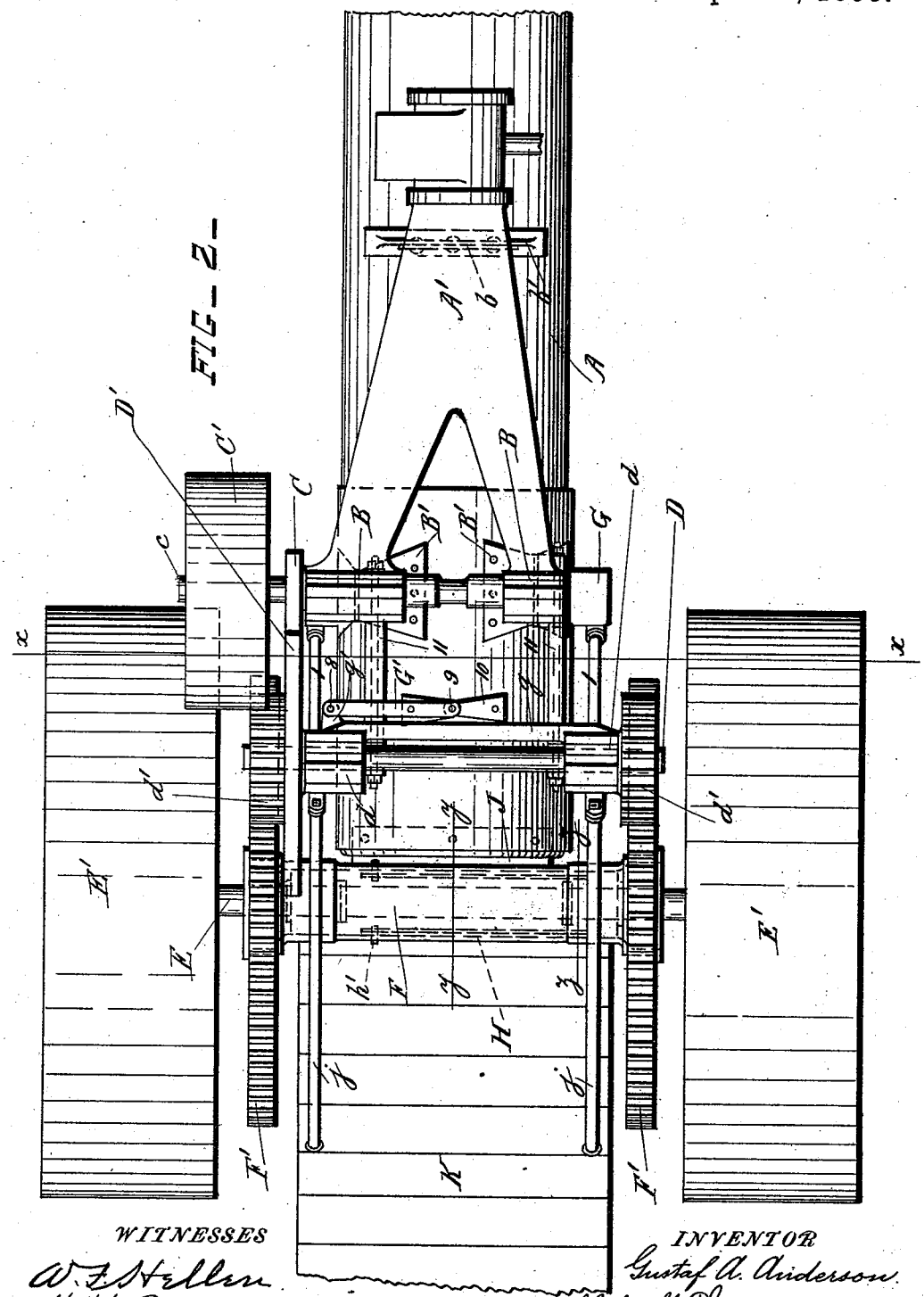

GUSTAF ARVID ANDERSON, OF WAYNESBOROUGH, PENNSYLVANIA, ASSIGNOR TO THE GEISER MANUFACTURING COMPANY, OF SAME PLACE.

TRACTION-ENGINE.

SPECIFICATION forming part of Letters Patent No. 538,574, dated April 30, 1895.

Application filed January 26, 1895. Serial No. 536,325. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Traction-Engines; and I do hereby declare the following to be a full, clear, and exact description of the invention, such as will enable others skilled in the art to which it appertains to make and use the same.

This invention relates to traction engines; and it consists in the novel construction and combination of the parts hereinafter fully described and claimed whereby the driving mechanism is freed from the effects of the expansion and contraction of the boiler to which it is secured.

In the drawings, Figure 1 is a side view of a portion of a traction-engine. Fig. 2 is a plan view of the same. Fig. 3 is a cross-section taken on the line $x\ x$ in Fig. 2 and looking toward the rear end of the engine. Fig. 4 is a cross-section also taken on the line $x\ x$ in Fig. 2, but looking toward the front end of the engine. Figs. 5 and 6 are cross-sections through the axle and the tubular bearing, taken, respectively, on the lines $y\ y$ and $z\ z$ in Fig. 2. Fig. 7 is a longitudinal section through the tubular bearing, showing its connection with the axle. Fig. 8 is a detail side view of one of the countershaft-bearings, showing the countershaft in section and showing the connection of the distance-pieces to the bearing.

A is the boiler of the engine which is of ordinary approved construction, and A' is the steam engine which may be a single or a compound engine, and of any approved construction.

B are the crank shaft bearings of the steam engine which are supported by the brackets B' rigidly secured to the boiler.

Expansion supports are interposed between the brackets B' and the crank shaft bearings. These expansion supports consist of flexible plates $m$, of metal, arranged parallel to each other, longitudinally of the boiler, and secured to the said brackets B' and to lugs $m'$ on the under sides of the crank shaft bearings. The plates $m$ are preferably arranged under the middle portions of the bearings so that the bearing surfaces against which the shaft bears are constrained to wear evenly. The plates $m$ secure the crank shaft bearings to the boiler rigidly in a longitudinal direction, but permit the top portion of the boiler to expand and contract laterally without having any effect upon the crank shaft bearings. The other end of the steam engine bed and the steam cylinder are connected to the boiler by an expansion support consisting of a flexible metallic plate $b$ preferably secured to a lug on the under side of the bed and to a bracket $b'$ which is secured to the boiler. The flexible plate $b$ is arranged crosswise of the boiler and permits the boiler to expand and contract without straining or breaking the bed.

C is the toothed driving pinion secured on the crank shaft $c$ of the engine, and C' is the fly-wheel.

D is the countershaft which is journaled in the bearings $d$. D' is the toothed countershaft wheel which gears into the pinion C, and $d'$ are the toothed countershaft pinions secured one on each end of the countershaft.

E is the rear axle of the traction engine. This axle is supported in the vertically sliding bearings $e$, and E' are the road wheels which are mounted on the ends of the axle E.

F is a tubular bearing arranged across the front plate of the boiler, and encircling the axle E; and F' are the toothed master wheels journaled on the ends of the tubular bearing F, and gearing into the countershaft pinions $d'$. The master gear wheels F' are operatively connected with the respective road wheels E' by universal couplings, and a compensating gear is provided upon one side of the engine to enable it to turn corners, but these parts are not shown in the drawings as they may be of any approved construction and are not a part of the present invention.

In a simple form of engine only one master gear wheel and one countershaft pinion need be used, but when a large traction engine is constructed it is preferable to use two master gear wheels and two countershaft pinions. The proportions of the respective toothed wheels and pinions may be varied, and, if desired, fast and slow gearing may be used and provided with disengaging mechanism of approved construction so that the speed and tractive power of the engine may be changed.

G are two brackets rigidly secured one on each side of the boiler and arranged substantially under the brackets B'. A distance piece 1 connects each bracket G with the countershaft bearing d above it; a distance piece 2 connects each bracket G with the tubular bearing F, and a distance piece 3 connects each end of the tubular bearing F with the respective countershaft bearings. The three distance pieces 1, 2, and 3, form a triangular framework on each side of the engine. The distance pieces may be plain bars, but they are preferably formed of tubes 4 which hold the parts at the required distances apart, and bolts 5 which pass through holes in the parts and through the tubes. The bolts are provided with nuts 6 upon one end or both ends, or with heads 7 upon one end which are dropped into pockets in the countershaft bearings or other parts with which they engage as shown in Fig. 8.

The two countershaft bearings d are braced together by the bar g, and are prevented from moving laterally by means of the horizontal radius bar G'. This radius bar is pivoted to the lug g' on one of the countershaft bearings by the pin 8, as shown in Fig. 2, and the other end of the radius bar is pivoted on the pin 9 projecting from the bracket 10 which is rigidly secured to the top of the boiler.

The two countershaft bearings d are connected to the two brackets B' by distance pieces 11 which are of similar construction to the distance pieces 1, 2 and 3.

The axle E is provided with collars 12 and 13 at the sides of the bearings e to keep these bearings at the same distance apart and to prevent the axle from sliding longitudinally in them.

H are vertical radius bars arranged one on each side of the axle E. One end of each bar H is pivoted to a pin h on one of the bearings e, and its other end is pivoted to the tubular bearing F by the pin h'.

The bearings e slide vertically between the guides 14 in the tubular bearing, and 15 are rods, secured to the bearings e. These rods pass through holes in the under side of the tubular bearing and have plates 16 secured on their lower ends. I are springs which are interposed between the plates 16 and the under side of the tubular bearing F.

J is an expansion support consisting of a flexible metallic plate secured to the tubular bearing F crosswise of the boiler. The lower edge of this plate is rigidly secured to the boiler by means of the angle bracket i.

K is the platform for the engineer to stand on. One end of this platform is secured to the tubular bearing F, and j are inclined bars which support the rear part of the platform. The bars j may be of similar construction to the distance pieces 1, 2 and 3. Their upper ends are connected to the lugs j' on the upper parts of the distance pieces 3, but they may be connected direct to the countershaft bearings, if preferred.

The longitudinal expansion and contraction of the boiler have no effect upon the relative positions which the countershaft bearings, the tubular bearing, and the crank shaft bearings always maintain with respect to each other. The vertical expansion and contraction of those parts of the boiler between the brackets B' and G are very slight and have no effect upon the triangular frames 1, 2, 3. The distance pieces 11 are connected to lugs on the countershaft bearings, and the connections of the distance pieces with the lugs may be free enough to admit of a slight pivotal movement of the distance pieces if desired, but in ordinary working the slight vertical expansion will not exceed the elasticity of the distance pieces 11. The horizontal radius bar G' permits the boiler to expand and contract longitudinally without affecting the countershaft bearings, while it prevents lateral strains from coming onto the top of the triangular framework 1, 2 3, on each side of the boiler.

The vertical radius bars H permit the road wheels to move vertically irrespective of each other, and hold the axle and its bearings laterally with respect to the tubular bearing.

The hook or other device by which machines or vehicles are attached to the traction engine is preferably secured to the rear end of the platform K.

What I claim is—

1. In a traction engine, the combination, with a boiler, of a steam engine having its crank shaft bearings rigidly secured in a longitudinal direction to the boiler, and a flexible plate arranged crosswise of the boiler and supporting the end of the bed and the steam cylinder, substantially as set forth.

2. In a traction engine, the combination, with the boiler, the countershaft bearings above the boiler, and the tubular bearing, for supporting the master gear wheels, arranged at the front of the boiler; of distance pieces rigidly connecting the said bearings together and to the sides of the boiler, and an expansion support for the said boiler secured to it and to the said tubular bearing and permitting the boiler to expand and contract longitudinally, substantially as set forth.

3. In a traction engine, the combination, with the boiler, and the tubular bearing, for supporting the master gear wheels, arranged at the front of the boiler; of an expansion support for the boiler secured to it and to the said tubular bearing and permitting the boiler to expand and contract longitudinally, and distance pieces rigidly secured to the said tubular bearing and to the sides of the boiler, substantially as set forth.

4. In a traction engine, the combination, with the boiler, the brackets B' rigidly secured thereto for supporting the crank shaft bearings, and the brackets G rigidly secured to the sides of the boiler below the brackets B'; of the countershaft bearings, the tubular bearing for the master gear wheels, an expansion support for the boiler secured to it and to the said tubular bearing, the distance pieces connecting the countershaft bearings with the brackets B'; and the distance pieces 1, 2, and 3, connecting the countershaft bearings and the tubular bearing together and to the brackets G, substantially as set forth.

5. In a traction engine, the combination, with the boiler, the countershaft bearings connected together, and frames connected to the sides of the boiler and to the said bearings; of a horizontal radius bar pivotally connected to the boiler and to one of the said bearings, thereby relieving them from lateral strains and permitting the boiler to expand and contract longitudinally, substantially as set forth.

6. In a traction engine, the combination, with the tubular bearing for supporting the master gear wheels, and the spring-supported bearings sliding vertically in the tubular bearing; of the axle supported in the said bearings and provided with means for preventing it from sliding longitudinally in them, and one or more vertical radius rods pivoted to the said tubular bearing and to one of the said axle bearings and permitting the ends of the axle to rise and fall independent of each other, substantially as set forth.

7. In a traction engine, the combination, with the boiler, and the brackets B' and G rigidly secured thereto; of the tubular bearing F, an expansion support for the boiler secured to it and to the said tubular bearing; the countershaft bearings, the distance pieces 1, 2, and 3, connecting the tubular bearing and the countershaft bearings together and to the brackets G; the distance pieces connecting the countershaft bearings to the brackets B'; the platform connected to the said tubular bearing, and the inclined bars connecting the rear part of the platform with the countershaft bearings, substantially as set forth.

8. In a traction engine, the combination, with a boiler, of a steam engine supported above the boiler, the expansion plates arranged longitudinally of the boiler and secured to the under side of the engine crank shaft bearings and to the boiler, and the expansion plate arranged crosswise of the boiler, secured thereto, and supporting the end of the bed and the steam cylinder, substantially as set forth.

In testimony whereof I affix my signature in presence of two witnesses.

GUSTAF ARVID ANDERSON.

Witnesses:
J. A. MIDDOWER,
DANIEL S. BEARD.